US009790669B2

United States Patent
Chuang

(10) Patent No.: US 9,790,669 B2
(45) Date of Patent: Oct. 17, 2017

(54) WATER-SAVING DEVICE FOR A FAUCET AND METHOD OF USING THE SAME

(71) Applicant: APLUS HARDWARE CORP., Taipei (TW)

(72) Inventor: Louis Chuang, Taipei (TW)

(73) Assignee: APLUS HARDWARE CORP., Taipei (TW)

( * ) Notice: Subject to any disclaimer, the term of this patent is extended or adjusted under 35 U.S.C. 154(b) by 104 days.

(21) Appl. No.: 15/010,530

(22) Filed: Jan. 29, 2016

(65) Prior Publication Data

US 2017/0138027 A1 May 18, 2017

(30) Foreign Application Priority Data

Nov. 13, 2015 (TW) .............................. 104137433 A

(51) Int. Cl.
*E03C 1/04* (2006.01)
*E03C 1/086* (2006.01)
*F16K 1/12* (2006.01)
*E03C 1/02* (2006.01)

(52) U.S. Cl.
CPC ................ *E03C 1/086* (2013.01); *E03C 1/04* (2013.01); *F16K 1/123* (2013.01); *E03C 2001/026* (2013.01)

(58) Field of Classification Search
CPC .......... E03C 1/04; E03C 1/0404; E03C 1/086; E03C 2001/026
USPC ........... 137/513.5, 801; 239/428.5, 569, 579, 239/583
See application file for complete search history.

(56) References Cited

U.S. PATENT DOCUMENTS

| | | | | |
|---|---|---|---|---|
| 6,131,608 A | * | 10/2000 | Lu | F16K 31/385 137/550 |
| 7,552,879 B2 | * | 6/2009 | Nagata | E03C 1/08 239/428.5 |
| 2010/0065661 A1 | * | 3/2010 | Grether | E03C 1/084 239/428.5 |
| 2012/0018661 A1 | * | 1/2012 | Kao | E03C 1/0412 251/359 |

* cited by examiner

*Primary Examiner* — Marina Tietjen
*Assistant Examiner* — Paul J Gray
(74) *Attorney, Agent, or Firm* — Birch, Stewart, Kolasch & Birch, LLP

(57) ABSTRACT

A water-saving device for a faucet has a main body. A flow-controlling member and a movable flow-blocking member are mounted in the main body. The main body has multiple receiving holes that receive respectively multiple positioning balls. A driving member movably receives an outer surface of the main body. When the faucet is open, the flow-controlling member and the flow-blocking member facilitate a water flow that is adjustable and stable. A user pulls the driving member downwards for increasing the water flow as required. The positioning balls are mounted in the driving member. The flow-blocking member that is pressed by the water flow moves downwards. When the faucet is closed, the flow-blocking member restores to an original position, thereby automatically adjusting the faucet to a minimum water flow for next use and economizes the water usage.

20 Claims, 8 Drawing Sheets

WATER-SAVING DEVICE FOR A FAUCET AND METHOD OF USING THE SAME

BACKGROUND OF THE INVENTION

1. Field of the Invention

The present invention relates to a water-saving device for a faucet. The water-saving device provides a water flow that is stable and adjustable. The water flow of the faucet assembled with the water-saving device is capable of increasing as required. When the faucet is closed, the water flow is adjusted automatically to a minimum water usage.

2. Description of the Related Art

A faucet is a hardware appliance that is commonly used in daily life. The faucet controls whether a water flow is supplied. Meanwhile, the faucets are classified depending on locations of use, such as faucets for a kitchen counter or faucets for a bathroom.

For the environmental protection, the economization of water resources is an important object. With reference to FIG. 8, an aerator 80 that is a conventional water-saving device is mounted in an outlet of a faucet 70. The aerator 80 has a filter that is mounted in the aerator 80. When a water flow that departs from the faucet passes through the aerator, the water flow mixes with air to produce a bubble-water flow. Thus, the volume of the air replaces the volume of the water. Therefore, the aerator 80 facilitates water saving.

However, the effect of economization in water usage is limited with the aerator 80 that is mounted in the outlet of a faucet 70. The aerator 80 that cannot effectively economize the water usage brings out the burden of the domestic water supply.

Meanwhile, other kinds of conventional water-saving devices are operated manually by the user. The user adjusts the water-saving device for increasing the water flow as required and operates reversely the water-saving device for decreasing the water flow. Thus, the quantity of water usage recovers to an original water flow.

However, the supplies of the water flow that are controlled manually by the user are not adjusted easily. Thus, the user operates the water-saving device inconveniently.

SUMMARY OF THE INVENTION

An objective of the present invention is to provide a water-saving device for a faucet. The water-saving device provides a water flow that is stable and adjustable. The water flow of the faucet assembled with the water-saving device is capable of increasing as required. When the faucet is closed, the water flow is automatically adjusted to a minimum water usage.

To achieve the foregoing objective, the water-saving device in accordance with the present invention comprises a main body, a flow-controlling member, a flow-blocking member, multiple positioning balls, and a driving member. The main body has an assembling recess, an assembling part, a flange, a connecting hole, and multiple receiving holes. The assembling recess is defined in a top surface of the main body. The assembling part protrudes from a central part of a bottom surface of the assembling recess and has a flowing hole that is defined through the assembling part. The flange protrudes radially from an outer surface of the main body. The connecting hole is defined in a bottom surface of the main body and communicates with the flowing hole. The receiving holes are defined radially through the main body, are spaced apart at intervals, and communicate with the assembling recess. The receiving holes are disposed corresponding to the assembling part in position. The flow-controlling member is mounted in the assembling recess of the main body. A bottom surface of the flow-controlling member abuts an inner surface of the assembling recess. The flow-controlling member has a passage hole, a first through hole, and multiple second through holes. The passage hole is defined through a central part of a top surface of the flow-controlling member and is disposed corresponding to the flowing hole of the assembling part in position. The first through hole is defined through a central part of the bottom surface of the flow-controlling member and communicates with the passage hole. The first through hole is disposed corresponding to the flowing hole in position. The second through holes are defined through the bottom surface of the flow-controlling member, are spaced annularly apart at intervals, and communicate with the passage hole. The flow-blocking member is mounted movably and tightly between the assembling recess of the main body and the assembling part. A top surface of the flow-blocking member is capable of closing the second through holes of the flow-controlling member. The flow-blocking member has an assembling hole and a rounded part. The assembling hole is defined through the flow-blocking member and receives tightly an outer surface of the assembling part. The rounded part is formed in an annular edge of a bottom surface of the flow-blocking member. The positioning balls are mounted in the receiving holes respectively. Each positioning ball is capable of abutting the rounded part of the flow-blocking member. The driving member movably receives the outer surface of the main body and has a mounting hole, a first accommodating recess, and a second accommodating recess. The mounting hole is defined through the driving member. The first accommodating recess is defined in an inner surface of the driving member. A bottom surface of the first accommodating recess is capable of abutting the flange of the main body. The second accommodating recess is defined in an inner surface of the driving member, is disposed at an interval relative to the first accommodating recess, and is capable of receiving the positioning balls.

Other objectives, advantages and novel features of the invention will become more apparent from the following detailed description when taken in conjunction with the accompanying drawings.

DETAILED DESCRIPTION OF THE INVENTION

Figure 1:
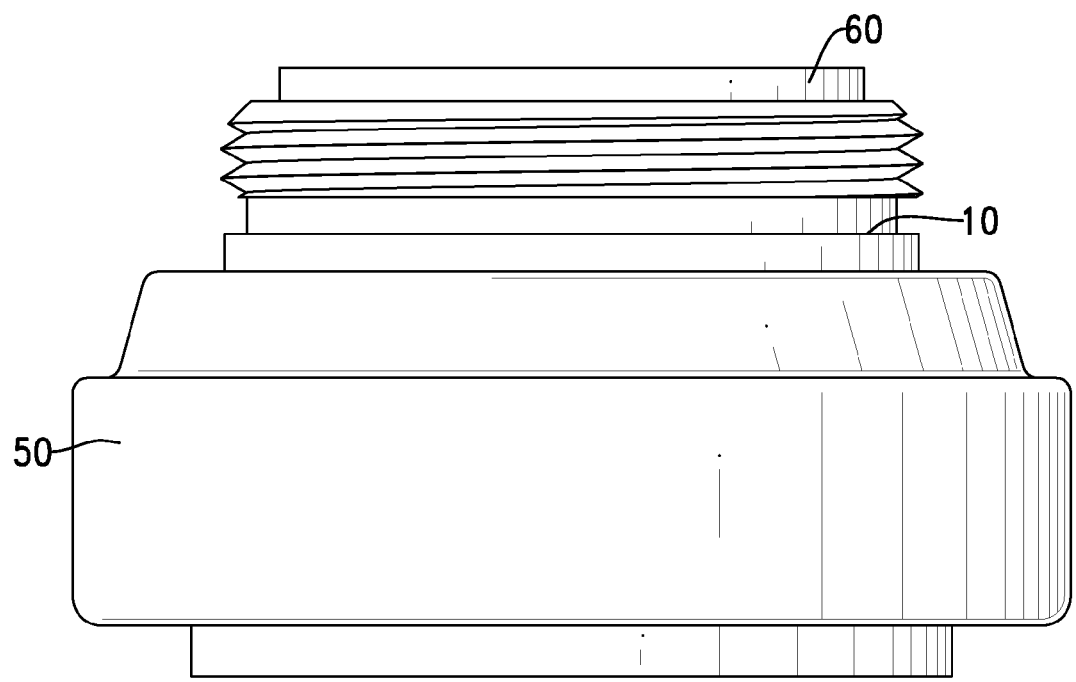
FIG. 1 is a front view of a water-saving device in accordance with the present invention.
Figure 2:
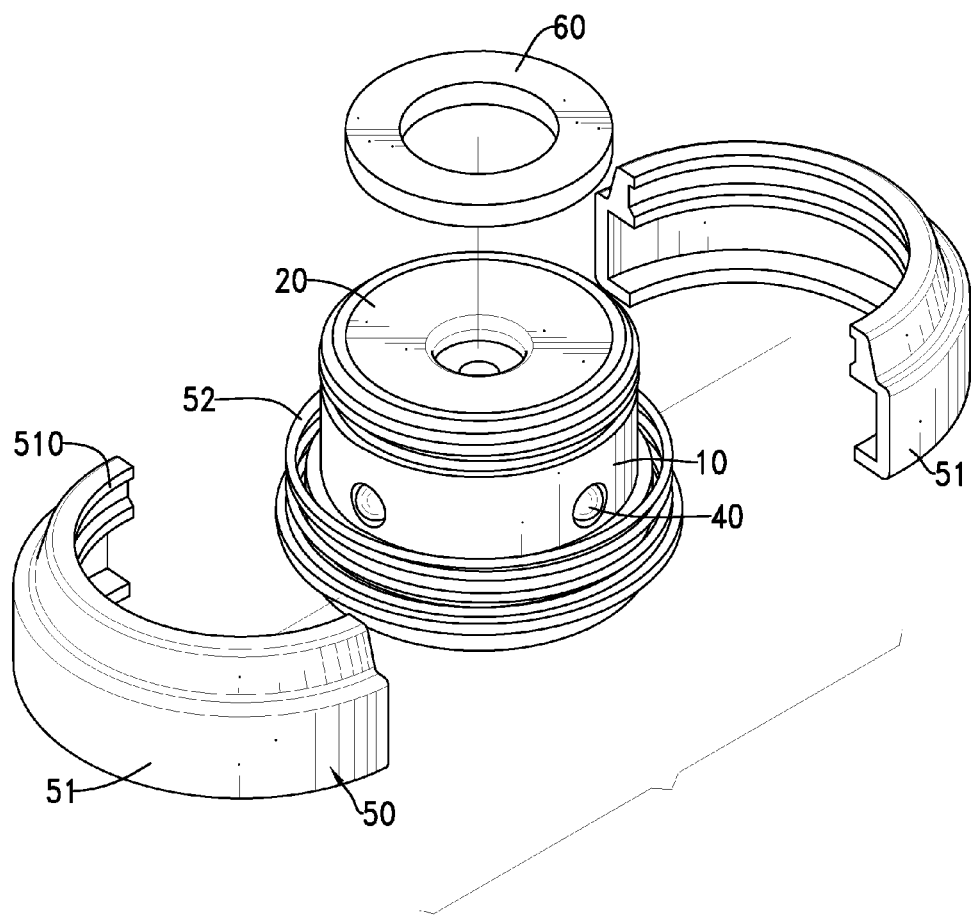
FIG. 2 is an exploded perspective view of the water-saving device in FIG. 1.
Figure 3:
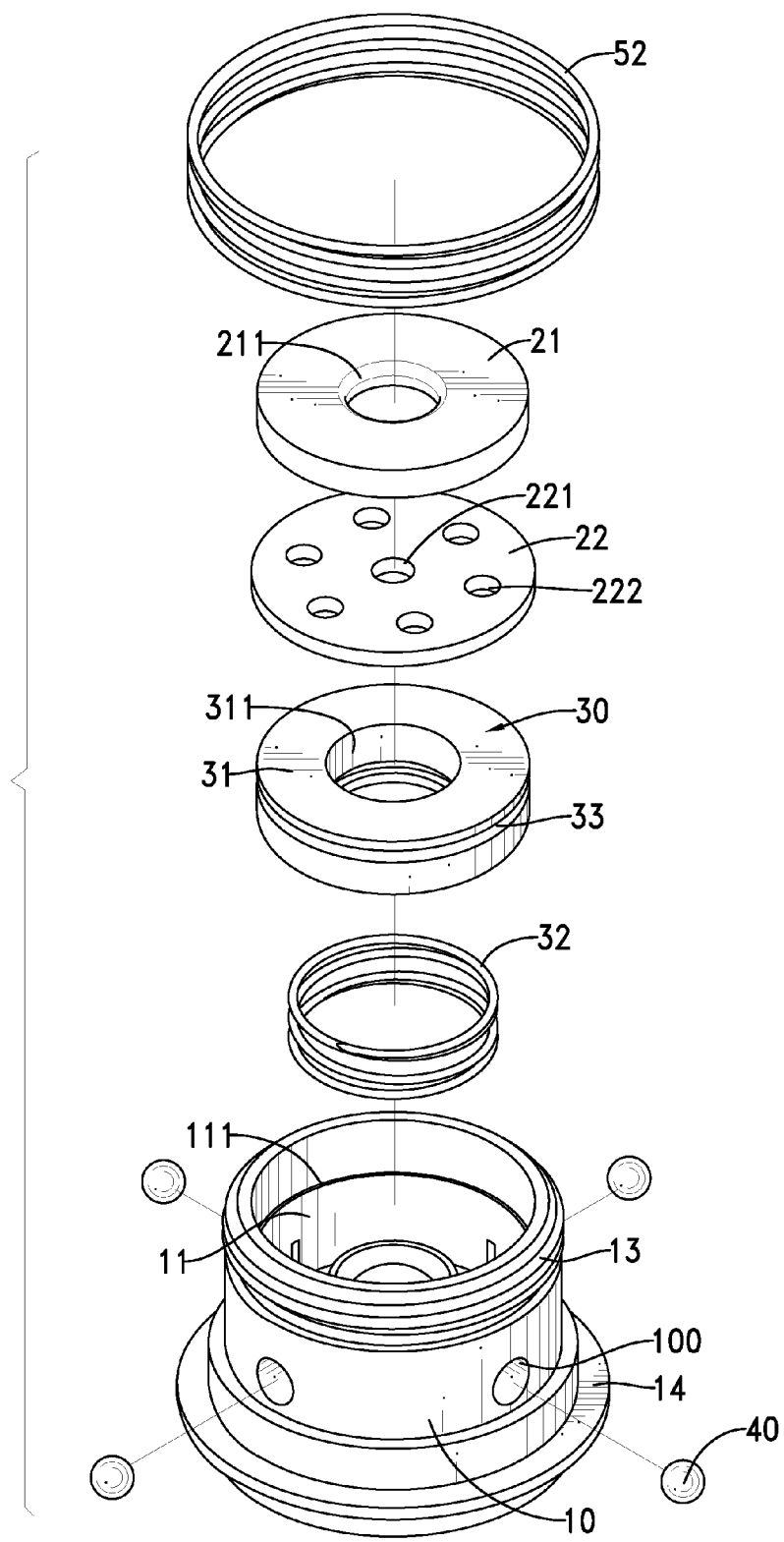
FIG. 3 is an exploded perspective view of the water-saving device in FIG. 2.

With reference to FIGS. 1 to 3, a water-saving device for a faucet in accordance with the present application has a main body 10, a flow-controlling member 20, a flow-blocking member 30, multiple positioning balls 40, a driving member 50, and a gasket 60.

Figure 4:
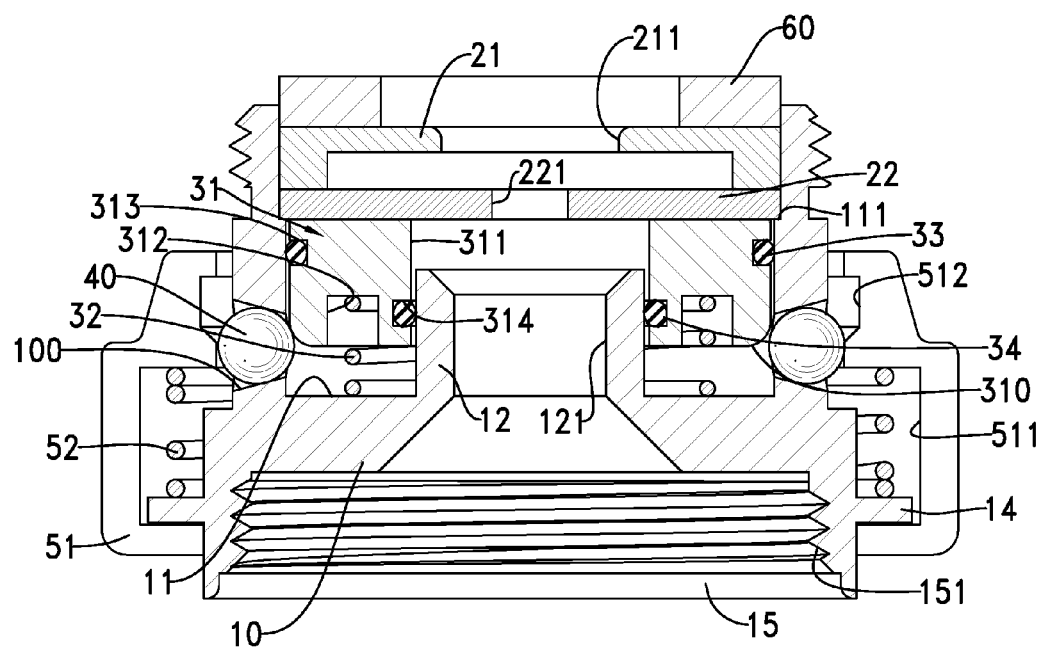
FIG. 4 is a cross sectional side view of the water-saving device in FIG. 1.

With reference to FIGS. 3 to 4, the main body 10 has an assembling recess 11, an assembling part 12, a first mounting part 13, a flange 14, a connecting hole 15, and multiple receiving holes 100.

The assembling recess 11 is defined in a top surface of the main body 10 and has an abutting part 111 that protrudes radially from an inner surface of the assembling recess 11.

The assembling part 12 protrudes from a central part of a bottom surface of the assembling recess 11 and has a flowing hole 121 that is defined through the assembling part 12.

The first mounting part 13 is formed in an outer surface of the main body 10. Specifically, the first mounting part 13 has an external thread.

The flange 14 protrudes radially from the outer surface of the main body 10.

The connecting hole 15 is defined in a bottom surface of the main body 10, communicates with the flowing hole 121, and has a second mounting part 151 that is formed in an inner surface of the connecting hole 15. Specifically, the second mounting part 151 has an internal thread.

The receiving holes 100 are defined radially through the main body 10, are spaced apart at intervals, and communicate with the assembling recess 11. The receiving holes 100 are disposed corresponding to the assembling part 12 in position. A diameter of each receiving hole 100 is gradually reduced from the outer surface of the main body 10 towards the assembling recess 11.

Figure 6:
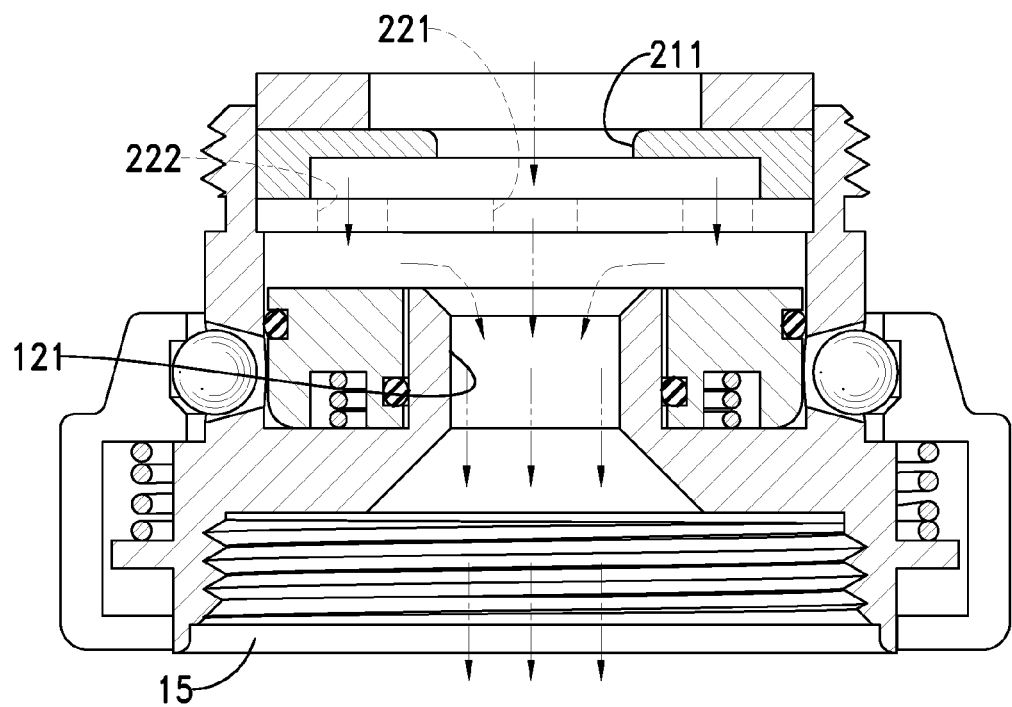
FIG. 6 is another cross sectional side view of the water-saving device in FIG. 5, shown in use.

With reference to FIGS. 3, 4 and 6, the flow-controlling member 20 is mounted in the assembling recess 11 of the main body 10 and has a passage hole 211, a first through hole 221 and multiple second through holes 222, wherein a bottom surface of the flow-controlling member 20 abuts the inner surface of the assembling recess 11.

The passage hole 211 is defined through a central part of a top surface of the flow-controlling member 20 and is disposed corresponding to the flowing hole 121 of the assembling part 12 in position.

The first through hole 221 is defined through a central part of the bottom surface of the flow-controlling member 20 and communicates with the passage hole 211. The first through hole 221 is disposed corresponding to the flowing hole 121 in position.

The multiple second through holes 222 are defined through the bottom surface of the flow-controlling member 20, are spaced annularly apart at intervals, and communicate with the passage hole 211.

Figure 5:
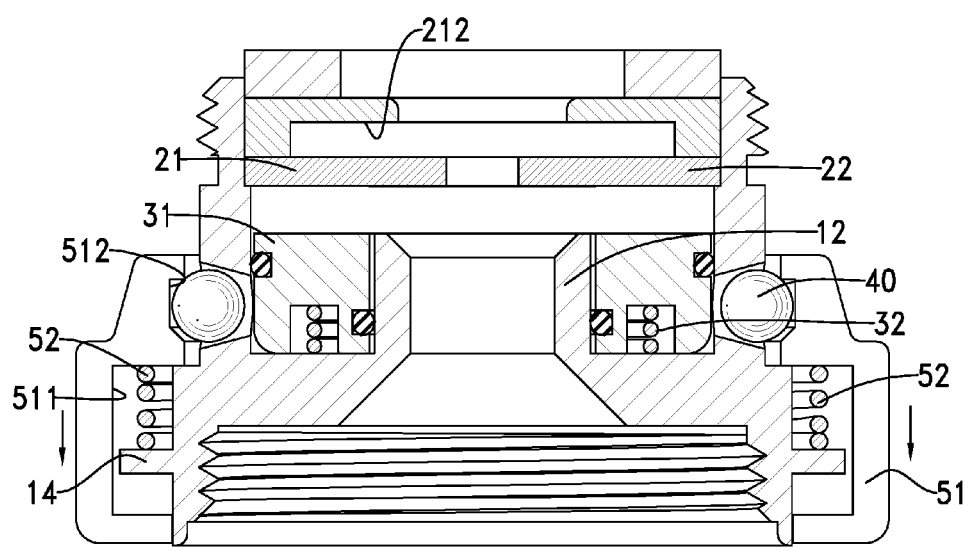
FIG. 5 is an operational cross sectional side view of the water-saving device in FIG. 4.

Specifically, with reference to FIGS. 3 to 5, the flow-controlling member 20 has a guiding plate 21 and an orifice plate 22.

The guiding plate 21 has the passage hole 211 and a bottom recess 212.

The passage hole 211 is defined through a central part of the guiding plate 21.

The bottom recess 212 is defined in a bottom surface of the guiding plate 21 and communicates with the passage hole 211.

The orifice plate 22 is mounted between the guiding plate 21 and the abutting part 111 and has the first through hole 221 and the second through holes 222, wherein a top surface of the orifice plate 22 abuts the bottom surface of the guiding plate 21 and a bottom surface of the orifice plate 22 abuts the abutting part 111 of the assembling recess 11.

The first through hole 221 is defined through a central part of the orifice plate 22.

The second through holes 222 are defined through the orifice plate 22 and spaced annularly apart at intervals, wherein the second through holes 222 are disposed corresponding to the bottom recess 212 of the guiding plate 21 in position.

With reference to FIGS. 3 and 4, the flow-blocking member 30 is mounted movably and tightly between the assembling recess 11 of the main body 10 and the assembling part 12, and has an assembling hole 311 and a rounded part 310, wherein a top surface of the flow-blocking member 30 is capable of closing the second through holes 222 of the flow-controlling member 20.

The assembling hole 311 is defined through the flow-blocking member 30 and receives tightly an outer surface of the assembling part 12.

The rounded part 310 is formed in an annular edge of a bottom surface of the flow-blocking member 30.

Specifically, the flow-blocking member 30 has an enclosing block 31, a first spring 32, a first O-ring 33, and a second O-ring 34.

The enclosing block 31 is disposed corresponding to the bottom surface of the orifice plate 22 in position and has the assembling hole 311, a positioning recess 312, a first mounting groove 313, a second mounting groove 314, and the rounded part 310.

The assembling hole 311 is defined through a central part of the enclosing block 31.

The positioning recess 312 is defined annularly in a bottom surface of the enclosing block 31 and encircles the assembling hole 311.

The first mounting groove 313 is defined in an outer surface of the enclosing block 31.

The second mounting groove 314 is defined in an inner surface of the assembling hole 311 of the enclosing block 31.

The rounded part 310 is located in an annular edge of the bottom surface of the enclosing block 31, wherein a top surface of the enclosing block 31 is capable of abutting the bottom surface of the orifice plate 22 to enclose the second through holes 222.

The first spring 32 receives the outer surface of the assembling part 12 of the main body 10. One of two ends of the first spring 32 abuts the bottom surface of the assembling recess 11. The other end of the first spring 32 abuts the positioning recess 312 of the enclosing block 31.

The first O-ring 33 is mounted in the first mounting groove 313 and abuts the inner surface of the assembling recess 11.

The second O-ring 34 is mounted in the second mounting groove 314 and abuts the outer surface of the assembling part 12.

With reference to FIGS. 2 to 4, the positioning balls 40 are mounted respectively in the receiving holes 100 of the main body 10. Each positioning ball 40 is capable of abutting the rounded part 310 of the flow-blocking member 30. Specifically, each of the positioning balls 40 is capable of extending out of the outer surface of the main body 10. The positioning ball 40 is capable of extending out of the inner surface of the assembling recess 11 to abut the rounded part 310 of the enclosing block 31.

With reference to FIGS. 2 and 4, the driving member 50 movably receives the outer surface of the main body 10 and has a mounting hole 510, a first accommodating recess 511, and a second accommodating recess 512.

The mounting hole 510 is defined through the driving member 50.

The first accommodating recess 511 is defined in an inner surface of the mounting hole 510. A bottom surface of the first accommodating recess 511 is capable of abutting the flange 14 of the main body 10.

The second accommodating recess 512 is defined in the inner surface of the mounting hole 510, is disposed at an interval relative to the first accommodating recess 511, and is capable of receiving the positioning balls 40.

Specifically, the driving member 50 has an annular body 51 and a second spring 52.

The annular body 51 has the mounting hole 510, the first accommodating recess 511, and the second accommodating recess 512.

The mounting hole 510 is defined through a central part of the annular body 51.

The first accommodating recess 511 is defined in the inner surface of the mounting hole 510 and is located in a bottom end of the inner surface of the mounting hole 510.

The second accommodating recess 512 is defined in the inner surface of the mounting hole 510 and is located in a top end of the inner surface of the mounting hole 510.

The second spring 52 is mounted in the first accommodating recess 511. One of two ends of the second spring 52 abuts the flange 14 of the main body 10. The other end of the second spring 52 abuts a top surface of the first accommodating recess 511.

With reference to FIGS. 2 and 4, the gasket 60 is mounted in the top surface of the flow-controlling member 20 and has a central hole that is formed in the gasket 60. The central hole of the gasket 60 is disposed corresponding to the passage hole 211 and the first through hole 221 in position.

When the water-saving device of the present invention is mounted in an outlet of a faucet, the steps for operating the water-saving device are implemented as follows.

First, a user opens the faucet to provide a water flow to the water-saving device.

Second, the water flow passes sequentially through the central hole of the gasket 60, the passage hole 211 of the guiding plate 21, the first through hole 221 of the orifice plate 22, the assembling hole 311, and the flowing hole 121 of the assembling part 12 of the main body 10, as shown in FIG. 4, and the water flow departs from the water-saving device.

Third, with reference to FIGS. 5 and 6, the user pulls the driving member 50 downwards for increasing the water flow. The annular body 51 overcomes a resilience of the second spring 52 and moves downwards. The flange 14 of the main body 10 departs from the bottom surface of the first accommodating recess 511. Meanwhile, the water flow passes through the second through holes 222 of the orifice plate 22 and presses the enclosing block 31 of the flow-blocking member 30. The enclosing block 31 overcomes a resilience of the first spring 32 and moves downwards to the bottom surface of the assembling recess 11. The rounded part 310 of the enclosing block 31 abuts the positioning balls 40 to extend out of the outer surface of the main body 10. The positioning balls 40 are mounted in the second accommodating recess 512 of the annular body 51 of the driving member 50.

Fourth, the water flow passes through the passage hole 211 of the guiding plate 21, the first through hole 221, and the second through holes 222 of the orifice plate 22. Thus, the enclosing block 31 of the flow-blocking member 30 is mounted in the bottom surface of the assembling recess 11. Because the second through holes 222 are open, the water flow that passes through the water-saving device is increased. Therefore, the increasing water flow passes through the passage hole 211, the first through hole 221, the second through holes 222 and the flowing hole 121, and departs from the water-saving device of the present invention.

Fifth, the user closes the faucet to stop the water flow passing through the water-saving device, as shown in FIG. 4. The first spring 32 pushes the enclosing block 31 of the flow-blocking member 30 to move upwards and to depart from the bottom surface of the assembling recess 11. The enclosing block 31 encloses the second through holes 222 of the flow-controlling member 20. The positioning balls 40 depart from the second accommodating recess 512 of the annular body 51 and are mounted in the receiving holes 100 of the main body 10. The annular body 51 that is pushed by the second spring 52 moves upwards. Then, the bottom surface of the first accommodating recess 511 abuts the flange 14 of the main body 10. The positioning balls 40 extend out of the inner surface of the assembling recess 11 and abut the rounded part 310 of the flow-blocking member 30.

Figure 7:
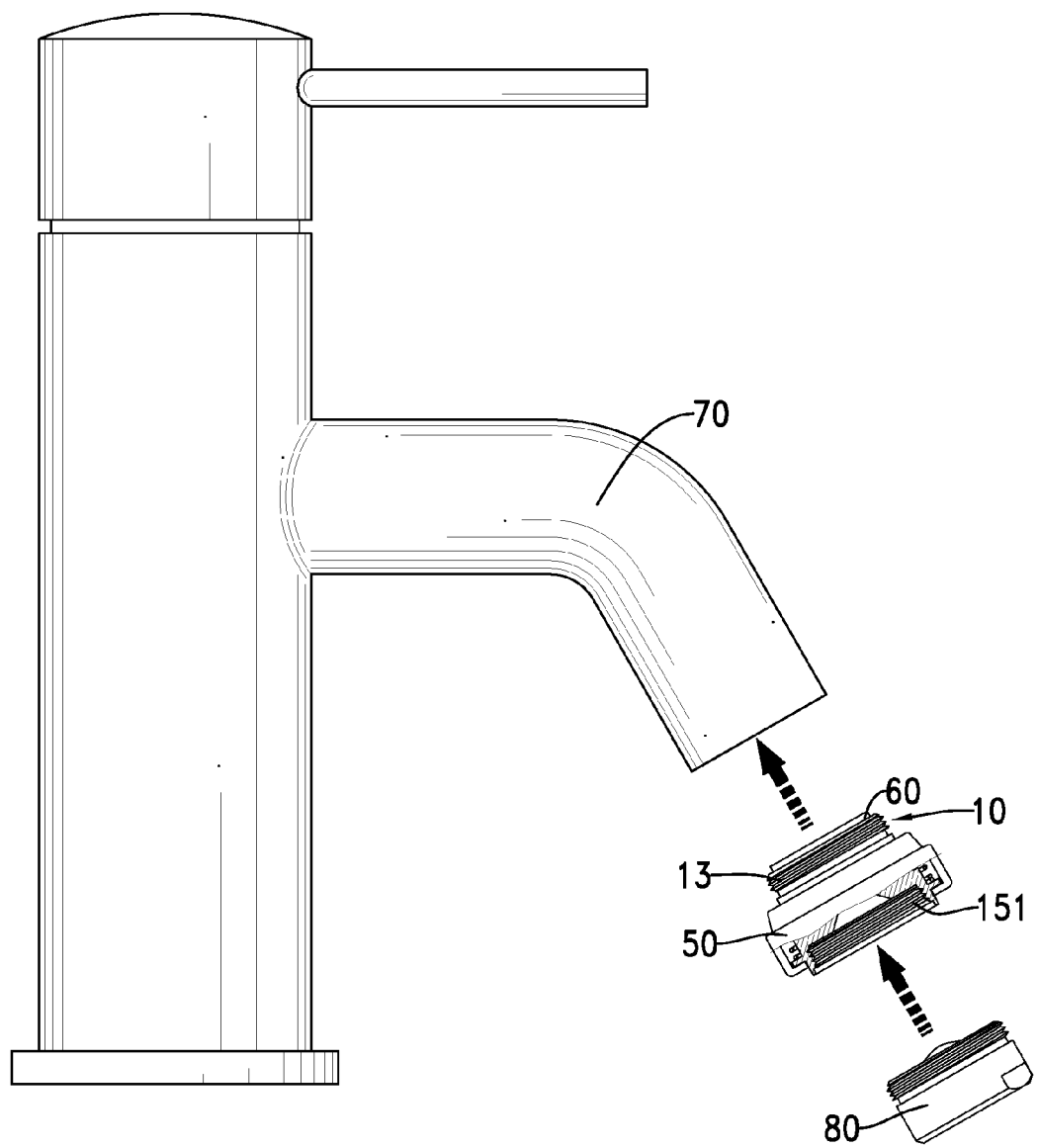
FIG. 7 is an exploded front view of the water-saving device that is mounted in a faucet.
Figure 8:
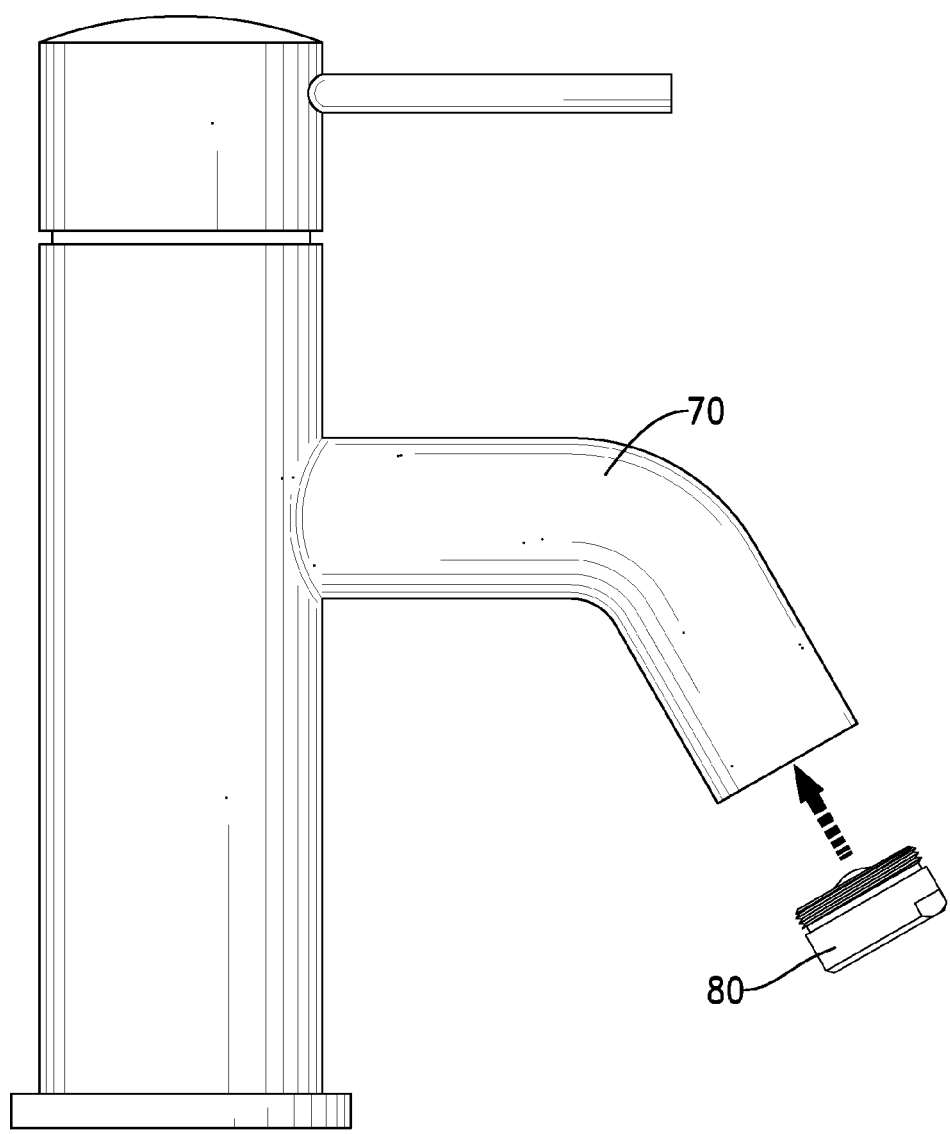
FIG. 8 is an exploded front view of a conventional aerator that is mounted in a faucet.

With reference to FIGS. 4 and 7, the water-saving device of the present invention is mounted in a faucet. The first mounting part 13 is mounted in an outlet of a faucet 70. The gasket 60 is mounted between and abuts the main body 10 and the outlet of the faucet 70, thereby ensuring sealing between the main body 10 and the faucet 70. The second mounting part 151 of the connecting hole 15 is capable of assembling an aerator 80 that is a conventional technique to mix a water flow with air.

Specifically, the annular body 51 of the driving member 50 is composed of two symmetrical blocks. The symmetrical blocks are mounted in the outer surface of the main body 10. Two parting surfaces of the symmetrical blocks abut and combine with each other. The combination may be implemented by ultrasonic welding. The ultrasonic welding is a conventional technique, and details thereof are omitted.

The rounded part 310 of the enclosing block 31 reduces contact areas between the enclosing block 31 and the positioning balls 40 to reduce friction. Therefore, the rounded part 310 assists the enclosing block 31 with moving downwards to abut the positioning balls 40.

The flow-controlling member 20 and the flow-blocking member 30 adjust a quantity of the water flow that passes through the water-saving device of the present invention. The operations of the driving member 50 and the positioning balls 40 drive the flow-blocking member 30 to move upwards or downwards. Thus, the second through holes 222 of the orifice plate 22 are controlled to open or to close by the flow-blocking member 30. Therefore, the user is capable of increasing the water flow. In a normal condition, the positioning balls 40 and the first spring 32 keep the enclosing block 31 of the flow-blocking member 30 abutting the bottom surface of the orifice plate 22 and enclosing the second through holes 222. The water flow only passes through the first through hole 221 that regulates the water flow of the faucet and economizes the water usage.

When the user closes the faucet to stop the water flow, the enclosing block 31 of the flow-blocking member 30 restores to an original position by the resilience of the first spring 32 to enclose the second through holes 222. The water-saving device automatically adjusts the faucet to a minimum water flow for next use.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A water-saving device for a faucet, comprising:
a main body having
an assembling recess defined in a top surface of the main body;
an assembling part protruding from a central part of a bottom surface of the assembling recess and having a flowing hole defined through the assembling part;
a flange protruding radially from an outer surface of the main body;
a connecting hole defined in a bottom surface of the main body and communicating with the flowing hole; and
multiple receiving holes defined radially through the main body, spaced apart at intervals, and communicating with the assembling recess, and the receiving holes disposed corresponding to the assembling part in position;
a flow-controlling member mounted in the assembling recess of the main body, and a bottom surface of the flow-controlling member abutting an inner surface of the assembling recess, the flow-controlling member having
a passage hole defined through a central part of a top surface of the flow-controlling member and disposed corresponding to the flowing hole of the assembling part in position;
a first through hole defined through a central part of the bottom surface of the flow-controlling member and communicating with the passage hole, the first through hole disposed corresponding to the flowing hole in position; and
multiple second through holes defined annularly through the bottom surface of the flow-controlling member, spaced apart at intervals, and communicating with the passage hole;
a flow-blocking member mounted movably and tightly between the assembling recess of the main body and the assembling part, and a top surface of the flow-blocking member being capable of closing the second through holes of the flow-controlling member, the flow-blocking member having
an assembling hole defined through the flow-blocking member and receiving tightly an outer surface of the assembling part; and
a rounded part formed in an annular edge of a bottom surface of the flow-blocking member;
multiple positioning balls mounted respectively in the receiving holes, and each positioning ball being capable of abutting the rounded part of the flow-blocking member; and
a driving member movably receiving the outer surface of the main body and having
a mounting hole defined through the driving member;
a first accommodating recess defined in an inner surface of the mounting hole, and a bottom surface of the first accommodating recess being capable of abutting the flange of the main body; and
a second accommodating recess defined in the inner surface of the mounting hole, disposed at an interval relative to first accommodating recess, and being capable of receiving the positioning balls.

2. The water-saving device for a faucet as claimed in claim 1, wherein the assembling recess of the main body has an abutting part protruding radially from the inner surface of the assembling recess; and
the flow-controlling member has
a guiding plate having
the passage hole defined through a central part of the guiding plate; and
a bottom recess defined in a bottom surface of the guiding plate and communicating with the passage hole; and
an orifice plate mounted between the guiding plate and the abutting part and having
the first through hole defined through a central part of the orifice plate; and
the second through holes defined annularly through the orifice plate and spaced apart at intervals, wherein a top surface of the orifice plate abuts the bottom surface of the guiding plate, a bottom surface of the orifice plate abuts the abutting part of the assembling recess, and the second through holes are disposed corresponding to the bottom recess of the guiding plate in position.

3. The water-saving device for a faucet as claimed in claim 2, wherein the flow-blocking member has
an enclosing block mounted to the bottom surface of the orifice plate and having
the assembling hole defined through a central part of the enclosing block;
a positioning recess defined annularly in a bottom surface of the enclosing block and encircling the assembling hole;
a first mounting groove defined in an outer surface of the enclosing block;
a second mounting groove defined in an inner surface of the assembling hole of the enclosing block; and
the rounded part located in an annular edge of the bottom surface of the enclosing block, wherein a top surface of the enclosing block is capable of abutting the bottom surface of the orifice plate to enclose the second through holes;
a first spring receiving the outer surface of the assembling part of the main body, one of two ends of the first spring abutting the bottom surface of the assembling recess, the other end of the first spring abutting the positioning recess of the enclosing block;
a first O-ring mounted in the first mounting groove and abutting the inner surface of the assembling recess; and
a second O-ring mounted in the second mounting groove and abutting the outer surface of the assembling part.

4. The water-saving device for a faucet as claimed in claim 3, wherein the driving member has
an annular body having
the mounting hole defined through a central part of the annular body;
the first accommodating recess located in a bottom end of the inner surface of the mounting hole; and
the second accommodating recess located in a top end of the inner surface of the mounting hole; and
a second spring mounted in the first accommodating recess, one of two ends of the second spring abutting the flange of the main body, and the other end of the second spring abutting a top surface of the first accommodating recess.

5. The water-saving device for a faucet as claimed in claim 4, wherein a diameter of each receiving hole is gradually reduced from the outer surface of the main body towards the assembling recess;

each of the positioning balls is capable of extending out of the outer surface of the main body to dispose in the second accommodating recess of the annular body; and the positioning ball is capable of extending out of the inner surface of the assembling recess to abut the rounded part of the enclosing block.

6. The water-saving device for a faucet as claimed in claim 5, wherein the main body further has a first mounting part formed in the outer surface of the main body; and the connecting hole further has a second mounting part formed in an inner surface of the connecting hole.

7. The water-saving device for a faucet as claimed in claim 6, wherein the water-saving device further has a gasket mounted in the top surface of the flow-controlling member and having a central hole formed in the gasket; and the central hole of the gasket is disposed corresponding to the passage hole and the first through hole in position.

8. The water-saving device for a faucet as claimed in claim 2, wherein the driving member has an annular body having the mounting hole defined through a central part of the annular body;

the first accommodating recess located in a bottom end of the inner surface of the mounting hole; and the second accommodating recess located in a top end of the inner surface of the mounting hole; and a second spring mounted in the first accommodating recess, one of two ends of the second spring abutting the flange of the main body, and the other end of the second spring abutting a top surface of the first accommodating recess.

9. The water-saving device for a faucet as claimed in claim 8, wherein a diameter of each receiving hole is gradually reduced from the outer surface of the main body towards the assembling recess;

each of the positioning balls is capable of extending out of the outer surface of the main body to dispose in the second accommodating recess of the annular body; and the positioning ball is capable of extending out of the inner surface of the assembling recess to abut the rounded part of the enclosing block.

10. The water-saving device for a faucet as claimed in claim 9, wherein the main body further has a first mounting part formed in the outer surface of the main body; and the connecting hole further has a second mounting part formed in an inner surface of the connecting hole.

11. The water-saving device for a faucet as claimed in claim 10, wherein the water-saving device further has a gasket mounted in the top surface of the flow-controlling member and having a central hole formed in the gasket; and the central hole of the gasket is disposed corresponding to the passage hole and the first through hole in position.

12. The water-saving device for a faucet as claimed in claim 1, wherein the driving member has an annular body having the mounting hole defined through a central part of the annular body;

the first accommodating recess located in a bottom end of the inner surface of the mounting hole; and the second accommodating recess located in a top end of the inner surface of the mounting hole; and a second spring mounted in the first accommodating recess, one of two ends of the second spring abutting the flange of the main body, and the other end of the second spring abutting a top surface of the first accommodating recess.

13. The water-saving device for a faucet as claimed in claim 12, wherein a diameter of each receiving hole is gradually reduced from the outer surface of the main body towards the assembling recess;

each of the positioning balls is capable of extending out of the outer surface of the main body to dispose in the second accommodating recess of the annular body; and the positioning ball is capable of extending out of the inner surface of the assembling recess to abut the rounded part of the enclosing block.

14. The water-saving device for a faucet as claimed in claim 13, wherein the main body further has a first mounting part formed in the outer surface of the main body; and the connecting hole further has a second mounting part formed in an inner surface of the connecting hole.

15. The water-saving device for a faucet as claimed in claim 14, wherein the water-saving device further has a gasket mounted in the top surface of the flow-controlling member and having a central hole formed in the gasket; and the central hole of the gasket is disposed corresponding to the passage hole and the first through hole in position.

16. A method of using a water-saving device for a faucet, the water-saving device having a main body having an assembling recess defined in a top surface of the main body;

an assembling part protruding from a central part of a bottom surface of the assembling recess and having a flowing hole defined through the assembling part;

a flange protruding radially from an outer surface of the main body;

a connecting hole defined in a bottom surface of the main body and communicating with the flowing hole; and multiple receiving holes defined radially through the main body, spaced apart at intervals, and communicating with the assembling recess, and the receiving holes disposed corresponding to the assembling part in position;

a flow-controlling member mounted in the assembling recess of the main body, and a bottom surface of the flow-controlling member abutting an inner surface of the assembling recess, the flow-controlling member having a passage hole defined through a central part of a top surface of the flow-controlling member and disposed corresponding to the flowing hole of the assembling part in position;

a first through hole defined through a central part of the bottom surface of the flow-controlling member and communicating with the passage hole, the first through hole disposed corresponding to the flowing hole in position; and multiple second through holes defined annularly through the bottom surface of the flow-controlling member, spaced apart at intervals, and communicating with the passage hole;

a flow-blocking member mounted movably and tightly between the assembling recess of the main body and the assembling part, and a top surface of the flow-blocking member being capable of closing the second through holes of the flow-controlling member, the flow-blocking member having an assembling hole defined through the flow-blocking member and receiving tightly an outer surface of the assembling part; and a rounded part formed in an annular edge of a bottom surface of the flow-blocking member;

multiple positioning balls mounted respectively in the receiving holes, and each positioning ball being capable of abutting the rounded part of the flow-blocking member; and a driving member movably receiving the outer surface of the main body and having a mounting hole defined through the driving member;

a first accommodating recess defined in an inner surface of the mounting hole, and a bottom surface of the first accommodating recess being capable of abutting the flange of the main body; and a second accommodating recess defined in the inner surface of the mounting hole, disposed at an interval relative to the first accommodating recess and being capable of receiving the positioning balls;

the method of using the water-saving device comprising:

mounting the water-saving device in an outlet of a faucet;

opening the faucet to provide a water flow to the water-saving device;

the water flow passing through the passage hole and the first through hole of the flow-controlling member and the flowing hole of the assembling part of the main body and departing from the water-saving device;

pulling the driving member downwards for increasing the water flow;

the flange of the main body departing from the first accommodating recess of the driving member;

the water flow passing through the second through holes of the flow-controlling member and pressing the flow-blocking member to move downwards to the bottom surface of the assembling recess of the main body;

the rounded part of the flow-blocking member abutting the positioning balls to extend out of the outer surface of the main body;

the positioning balls mounted in the second accommodating recess of the driving member;

the water flow passing through the passage hole, the first through hole, and the second through holes of the flow-controlling member;

the flow-blocking member mounted in the bottom surface of the assembling recess;

the increasing water flow passing through the passage hole, the first through hole and the second through holes of the flow-controlling member, the flowing hole of the assembling part and departing from the water-saving device;

closing the faucet to stop the water flow passing through the water-saving device;

the flow-blocking member departing from the bottom surface of the assembling recess and moving upwards;

the flow-blocking member enclosing the second through holes of the flow-controlling member;

the positioning balls departing from the second accommodating recess of the driving member and mounted in the receiving holes of the main body;

the driving member moving upwards, and the bottom surface of the first accommodating recess abutting the flange of the main body; and the positioning balls abutting the rounded part of the flow-blocking member.

17. The method of using a water-saving device for a faucet as claimed in claim 16, wherein the assembling recess of the main body of the water-saving device has an abutting part protruding radially from the inner surface of the assembling recess; and the flow-controlling member has a guiding plate having the passage hole defined through a central part of the guiding plate; and a bottom recess defined in a bottom surface of the guiding plate and communicating with the passage hole; and an orifice plate mounted between the guiding plate and the abutting part and having the first through hole defined through a central part of the orifice plate; and the second through holes defined annularly through the orifice plate and spaced apart at intervals, wherein a top surface of the orifice plate abuts the bottom surface of the guiding plate, a bottom surface of the orifice plate abuts the abutting part of the assembling recess, and the second through holes are disposed corresponding to the bottom recess of the guiding plate in position.

18. The method of using a water-saving device for a faucet as claimed in claim 17, wherein the flow-blocking member of the water-saving device has an enclosing block disposed corresponding to the bottom surface of the orifice plate in position and having the assembling hole defined through a central part of the enclosing block;

a positioning recess defined annularly in a bottom surface of the enclosing block and encircling the assembling hole;

a first mounting groove defined in an outer surface of the enclosing block;

a second mounting groove defined in an inner surface of the assembling hole of the enclosing block; and the rounded part located in an annular edge of the bottom surface of the enclosing block, wherein a top surface of the enclosing block is capable of abutting the bottom surface of the orifice plate to enclose the second through holes;

a first spring receiving the outer surface of the assembling part of the main body, one of two ends of the first spring abutting the bottom surface of the assembling recess, the other end of the first spring abutting the positioning recess of the enclosing block;

a first O-ring mounted in the first mounting groove and abutting the inner surface of the assembling recess; and a second O-ring mounted in the second mounting groove and abutting the outer surface of the assembling part.

19. The method of using a water-saving device for a faucet as claimed in claim 18, wherein the driving member of the water-saving device has an annular body having the mounting hole defined through a central part of the annular body;

the first accommodating recess located in a bottom end of the inner surface of the mounting hole; and the second accommodating recess located in a top end of the inner surface of the mounting hole; and a second spring mounted in the first accommodating recess, one of two ends of the second spring abutting the flange of the main body, and the other end of the second spring abutting a top surface of the first accommodating recess.

20. The method of using a water-saving device for a faucet as claimed in claim 19, wherein
- a diameter of each receiving hole is gradually reduced from the outer surface of the main body of the water-saving device towards the assembling recess;
- each of the positioning balls is capable of extending out of the outer surface of the main body to dispose in the second accommodating recess of the annular body;
- the positioning ball is capable of extending out of the inner surface of the assembling recess to abut the rounded part of the enclosing block;
- the main body further has a first mounting part formed in the outer surface of the main body;
- the connecting hole further has a second mounting part formed in an inner surface of the connecting hole;
- the water-saving device further has a gasket mounted in the top surface of the flow-controlling member and having a central hole formed in the gasket; and
- the central hole of the gasket is disposed corresponding to the passage hole and the first through hole in position.

* * * * *